US008483755B2

(12) United States Patent
Kumar (10) Patent No.: US 8,483,755 B2
(45) Date of Patent: Jul. 9, 2013

(54) DOCKING DISPLAY STATION WITH DOCKING PORT FOR RETAINING A HANDS-FREE HEADSET THEREIN

(75) Inventor: Rajendra Kumar, Akron, OH (US)

(73) Assignee: Khyber Technoliges, Corporation, Akron, OH (US)

( * ) Notice: Subject to any disclaimer, the term of this patent is extended or adjusted under 35 U.S.C. 154(b) by 1329 days.

(21) Appl. No.: 12/134,517

(22) Filed: Jun. 6, 2008

(65) Prior Publication Data

US 2008/0304688 A1   Dec. 11, 2008

Related U.S. Application Data

(63) Continuation-in-part of application No. 12/133,980, filed on Jun. 5, 2008.

(51) Int. Cl.
*H04M 1/00* (2006.01)

(52) U.S. Cl.
USPC .......... 455/556.1; 455/556.2; 455/557; 455/566; 455/569.1; 455/550.1; 455/41.2

(58) Field of Classification Search
USPC .......... 455/41.2, 550.1, 556.1, 566, 569.1, 455/575.2
See application file for complete search history.

(56) References Cited

U.S. PATENT DOCUMENTS

| 5,189,632 | A | 2/1993 | Paajanen et al. |
| 5,530,852 | A | 6/1996 | Meske, Jr. et al. |
| 5,625,673 | A | 4/1997 | Grewe et al. |
| 5,754,962 | A | 5/1998 | Griffin |
| 5,761,662 | A | 6/1998 | Dasan |
| 5,931,929 | A * | 8/1999 | Tran et al. ............. 710/69 |
| 5,974,334 | A | 10/1999 | Jones, Jr. |
| 6,052,603 | A * | 4/2000 | Kinzalow et al. ......... 455/557 |
| 6,069,593 | A | 5/2000 | Lebby et al. |
| 6,115,618 | A | 9/2000 | Lebby et al. |
| 6,137,481 | A | 10/2000 | Phillipps |
| 6,201,957 | B1 * | 3/2001 | Son et al. ............ 455/406 |
| 6,266,539 | B1 | 7/2001 | Pardo |
| 6,343,217 | B1 | 1/2002 | Borland |
| 6,426,872 | B1 * | 7/2002 | Sutton et al. .......... 361/679.41 |
| 7,120,462 | B2 | 10/2006 | Kumar |
| 7,603,148 | B2 * | 10/2009 | Michalak ............ 455/575.2 |
| 2002/0068549 | A1 | 6/2002 | Tendler |
| 2002/0163778 | A1 | 11/2002 | Hazzard et al. |
| 2003/0114186 | A1 | 6/2003 | Goetz |
| 2004/0019724 | A1 | 1/2004 | Singleton, Jr. et al. |
| 2004/0268005 | A1 | 12/2004 | Dickie |
| 2007/0035917 | A1 | 2/2007 | Hotelling et al. |
| 2008/0002369 | A1 | 1/2008 | Carnevali |
| 2008/0153543 | A1 * | 6/2008 | Newman et al. .......... 455/556.1 |

FOREIGN PATENT DOCUMENTS

CN      1196840      10/1998

* cited by examiner

*Primary Examiner* — Amancio Gonzalez
(74) *Attorney, Agent, or Firm* — Hahn, Loeser & Parks, LLP (57) ABSTRACT

A display unit having at least one docking port for receiving and retaining a complementary hands-free headset therein. The docking port comprises a recessed slot formed in the display unit housing. The headset preferably is frictionally retained within the docking port. The docking port is provided with a power jack connector that matingly engages a complementary power jack on the headset when docked, thereby recharging the rechargeable power supply in the headset.

26 Claims, 10 Drawing Sheets

DOCKING DISPLAY STATION WITH DOCKING PORT FOR RETAINING A HANDS-FREE HEADSET THEREIN

CROSS-REFERENCE TO RELATED APPLICATIONS

This application is a Continuation-in-Part of U.S. patent application Ser. No. 12/133,980, filed Jun. 5, 2008. The entire specification of this application is incorporated herein by reference.

BACKGROUND OF THE INVENTION

1. Technical Field

This invention generally relates to computing equipment. More particularly, the invention relates to personal computing, communications and entertainment devices. Specifically, the invention relates to a personal computing, communication and entertainment device that includes at least one docking port designed to receive and retain a complementary hands-free headset therein.

2. Background Information

To address consumers' portable computing, mobile communications, and portable entertainment needs, a variety of portable devices have been developed. The distinctly differing requirements of each application has made it too costly and unwieldy for such devices to fulfill more than one type or two closely related types of need.

For example, smart cell phones are devices that combine the capabilities of cell phones and electronic organizers. Typical of such devices are the Model PDQ-800 from Qualcomm, Incorporated of San Diego, Calif., and the Model R380 from Ericsson, Incorporated of Richardson, Tex. These products perform quite well as handheld computing and communication devices by allowing the user to access the Internet for email, stock quotes, etc. while preserving their use as simple wireless phone units. However, in order to allow handheld grasping, these units had to be kept small, thereby limiting their display to a size that is too small for practical use in conventional computing such as Web browsing, word processing, etc. Also, to keep the cost of such devices low, their designers employed central processors that have just enough power to carry out smart phone functions, and not enough power to handle general computing requirements.

Recently, Motorola, Inc. of Schaumburg, Ill. has begun to sell its clipOn Oganizer as an attachment to its StarTAC cellular telephone and to provide it with smart phone functionality. The clipOn Oganizer and StarTAC phone have been designed to operate as individual, stand-alone units that each furnish its own processor and power supply. Consequently, attaching the units does not achieve the reduced size or cost desired in an integrated combination.

For portable computing, the industry provides conventional laptop computers, such as those based on Pentium processors from Intel Corporation of Santa Clara, Calif. and Windows software from Microsoft Corporation of Redmond, Wash., and mini-laptop computers, such as Microsoft WindowsCE based devices, called Handheld Personal Computers (HPCs). The industry has also furnished palm-sized devices for personal information management and organization such as the Palm Pilot from 3Com Corporation of Santa Clara, Calif., and Microsoft WindowsCE-based palm-sized PCs.

To fulfill the portable entertainment needs of consumers, the computer industry provides digital audio players, such as the Diamond Multimedia Rio model made by S3, Inc. of Santa Clara, Calif. that plays MP3 compatible audio content downloaded from the Internet. Another portable entertainment device is the wireless system controller for home entertainment systems provided by Harmon/Kardon International of Woodbury, N.Y.

To fulfill both mobile computing and communication needs, a mobile user has to carry two, and sometimes three devices—a smart phone unit, an organizer, and a laptop unit. Of course, if entertainment is also desired, the user must carry yet another device—the MP3 player. The user has to purchase and maintain multiple units—charging multiple sets of batteries and synchronizing data from one with that of the other.

Additionally, hands-free or wireless headsets are commonly used by operators of computers, smartphones, cell phones, MP3 players and the like. As technology advances, these headsets are being manufactured in increasingly smaller and more compact versions. Since the headsets are not linked physically to the computing, communication and entertainment devices, one of the problems a user has is what to do with the headset when it is not in use. Additionally, the headsets need to be recharged periodically. This is typically done by connecting the headset to a power supply, such as an AC power supply, by using a power cord and transformer. This power cord adds yet another set of recharging equipment to individuals, households and businesses.

There is therefore a need in the art for an improved way to store and recharge hands-free headset units.

SUMMARY OF THE INVENTION

The device of the present invention comprises a display unit that includes at least one docking port for receiving and retaining a complementary hands-free headset therein. The docking port comprises a recessed slot formed in the housing of the display unit. The headset preferably is frictionally retained within the docking port. Additionally, the docking port is provided with a power jack connector that matingly engages a complementary power jack on the headset. Consequently, when the headset is engaged in the docking port, power is fed from the display unit to the headset to recharge the rechargeable power supply within the same. The display unit can take a variety of forms including a laptop type computing device that includes a central processing unit; a laptop type device that has an additional docking station for receiving a portable computing device therein; or a portable computing device such as a smartphone.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

One embodiment of an exemplary device in accordance with the present invention for mobile computing, communication and entertainment, is illustrated in FIGS. 1 through 4 and generally indicated by the numeral 10. Device 10 includes a detachable handset unit 20 and a docking display unit 30.

Figure 3:
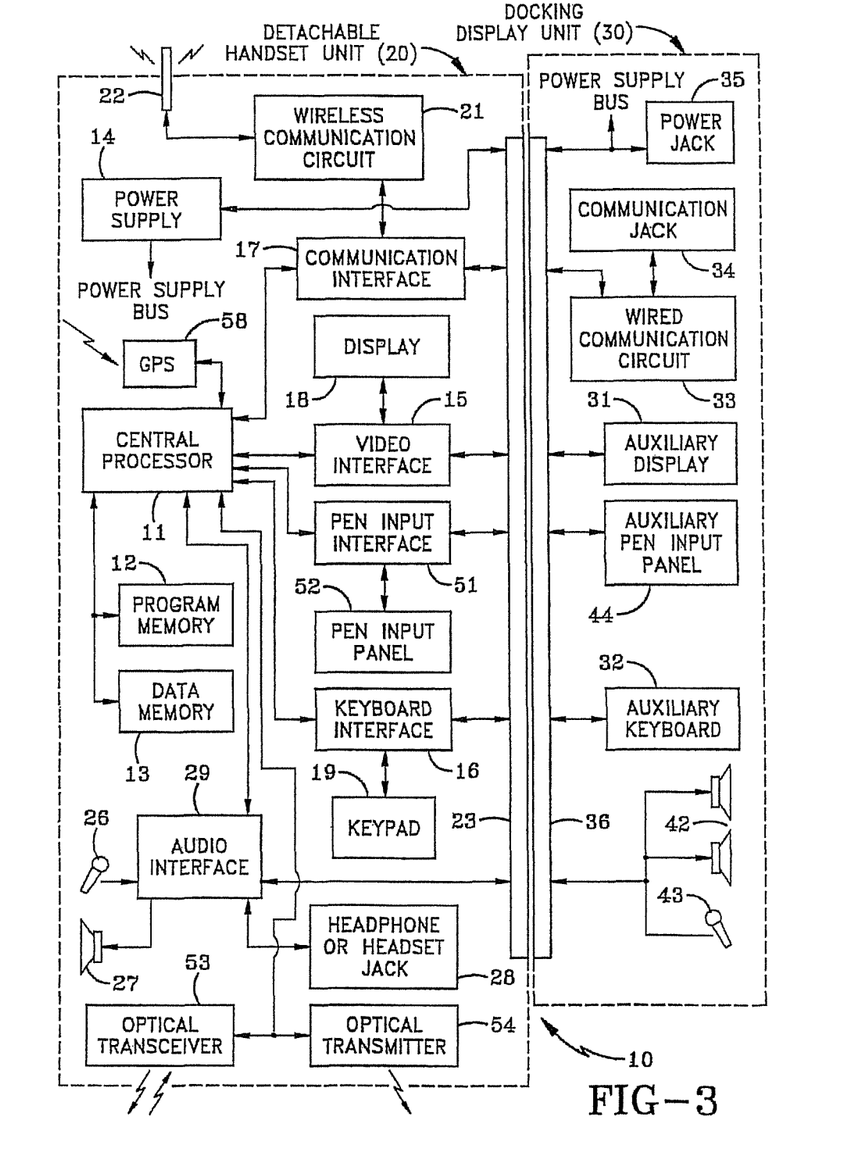
FIG. 3 is an exemplary block diagram of the device shown in FIG. 1.
Figure 4:
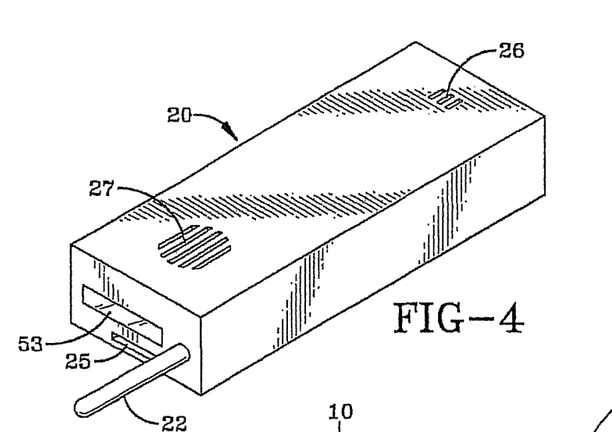
FIG. 4 is a rear perspective view of the detachable handset unit.

Detachable handset unit 20 may also include an electrical connector 23 that carries signals from the central processor 11 through video interface 15, keyboard interface 16, communication interface 17, pen-input interface 51, audio interface 29, and power supply 14. As seen in FIG. 3, the docking display unit 30 does not include a central processor, and one or more of the circuits in the docking display are operated by the central processor 11 of the detachable handset unit. Mating electrical connector 36 in docking display unit 30 may therefore connect these signals to auxiliary display 31, auxiliary keyboard 32, wired communication circuit 33, auxiliary pen-input panel 44, speakers 42 and microphone 43, and power-jack 35. Communication circuit 33 is connected to communication jack for further connection to communication lines such as the public switched telephone network or cell or other wireless network.

Figure 1:
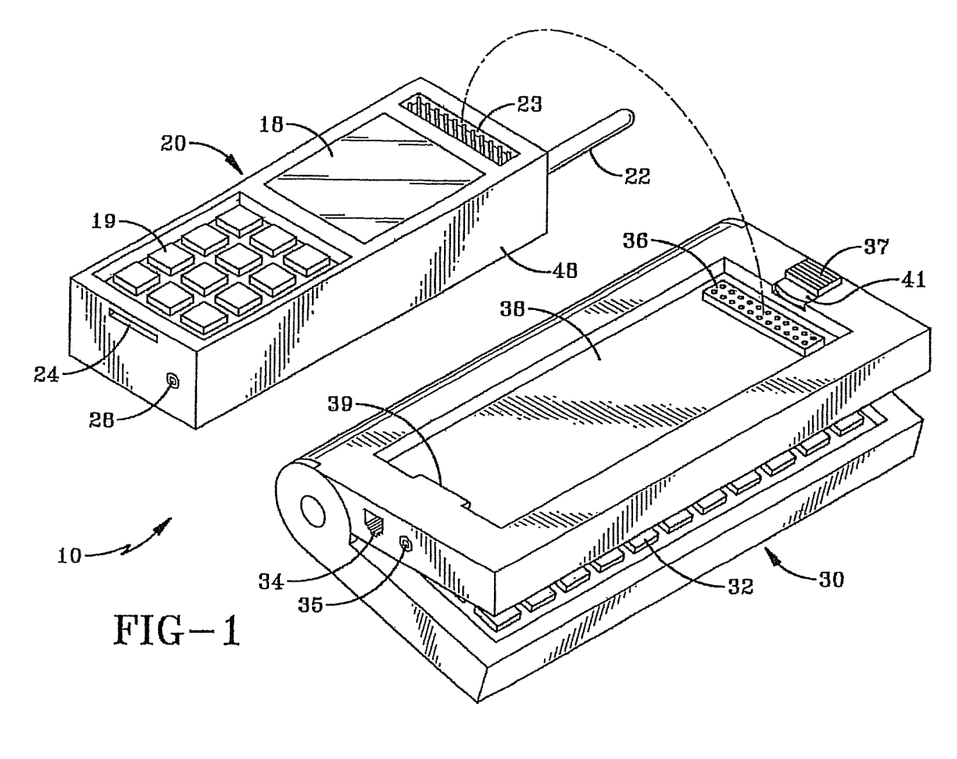
FIG. 1 is a perspective view of an exemplary device in accordance with the present invention for mobile computing, communication and entertainment. This view presents a front perspective view of a detachable handset unit and a top perspective view of a clamshell shaped docking display unit having a partially open lid and base, and illustrates diagrammatically how exemplary electrical connectors in each unit may engage and mate so that the units form a single combined device.
Figure 2:
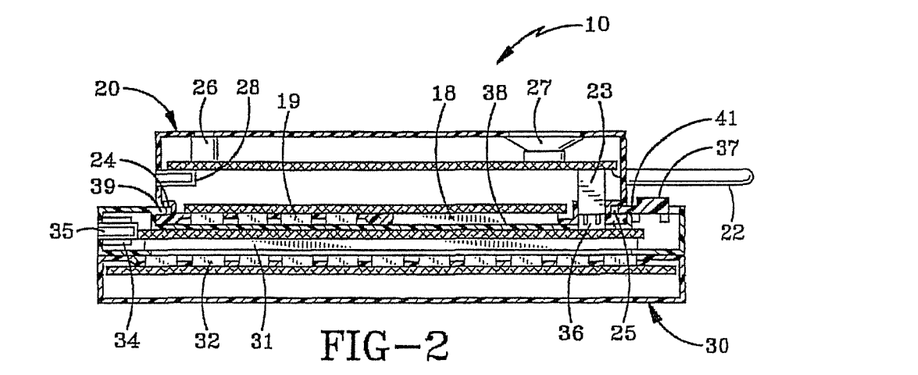
FIG. 2 is a cross-section elevational view of the exemplary device shown in FIG. 1 with the detachable handset unit mated with the docking display unit.

Docking display unit 30 includes a recessed platform 38, with an electrical connector 36, a fixed tab 39 and a movable tab 41, retractable by a latch 37. To dock detachable handset unit 20 into docking display unit 30, fixed tab 39 is slid into slot 24 with the front side of detachable handset unit 20 facing platform 38. The other end of detachable handset unit 20 is brought down to have connector 23 on detachable handset unit 20 mate with connector 36 of docking display unit 30. Tab 41 is slid into slot 25 to secure detachable handset unit 20 in place.

Docking display unit 30 is shown as a clamshell style unit, including an auxiliary display 31, in the lid portion and an auxiliary keyboard 32 in the base portion, facing each other in the closed position. The lid of docking display unit 30 also contains a communication jack 34 such as a standard RJ-style telephone jack, and a power jack 36, such as an AC adapter/charger jack.

The block diagram in FIG. 3 shows detachable handset unit 20 including a central processor 11, and the circuits supported and/or controlled by it, namely program memory 12, at memory 13, power supply 14, video interface 15, keyboard interface 16, communication interface 17, pen-input interface 61, and audio interface 29. In turn, video interface 15 drives display 18, the keyboard interface 16 drives the keypad 19, communication interface 17 drives wireless communication circuit 21, pen-input interface 51 drives the pen-input panel 52, and audio interface 29 drives microphone 26 and speaker 27, and connects to the headphone jack 28. Wireless communication circuit 21 is connected to the antenna 22. GPS receiver 58, such as that supplied by SiRF Technology of San Jose, Calif., is also connected to central processor 11.

Detachable handset unit 20 also includes an electrical connector 23 that carries signals from the central processor 11 through video interface 15, keyboard interface 16, communication interface 17, pen-input interface 51, audio-interface 29, and power supply 14. Mating electrical connector 36 in docking display unit 30 connects these signals to auxiliary display 31, auxiliary keyboard 32, wired communication circuit 33, auxiliary pen-input panel 44, speakers 42 and microphone 43, and power-jack 36. Wired communication circuit 33 is connected to communication jack 34 for further connection to external wired communication lines such as the public switched telephone network.

Detachable handset unit 20 may also contain an optical transmitter 54 for transmission of remote control signals to TV, VCR, etc. Alternately, it may be equipped with an optical transceiver 53 for optical communication with other compatible devices such as laptop computers, printers and network interfaces.

In another variation of the above embodiment of the interface signals connecting the circuitry carried in detachable handset unit 20 and docking display unit 30 may be multiplexed using conventional multiplexing circuits, in order to reduce the number of interconnect signals and hence reducing the size of connectors 23 and 36.

In another variation of the above embodiment, detachable handset unit 20 may contain no display at all, like conventional cordless handsets. In this case, central processor 11 will still drive the auxiliary display 31 through the video interface 15, and video interface 15 may be housing in docking display unit 30, further reducing the size of detachable handset unit 20.

Figure 5:
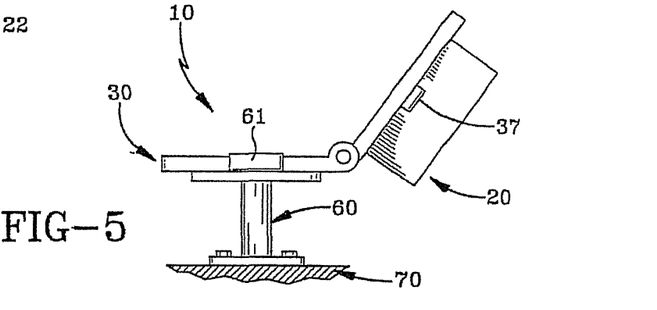
FIG. 5 is a side elevational view of the device shown in FIG. 1 when mounted in a vehicle and in an operational configuration.
Figure 6:
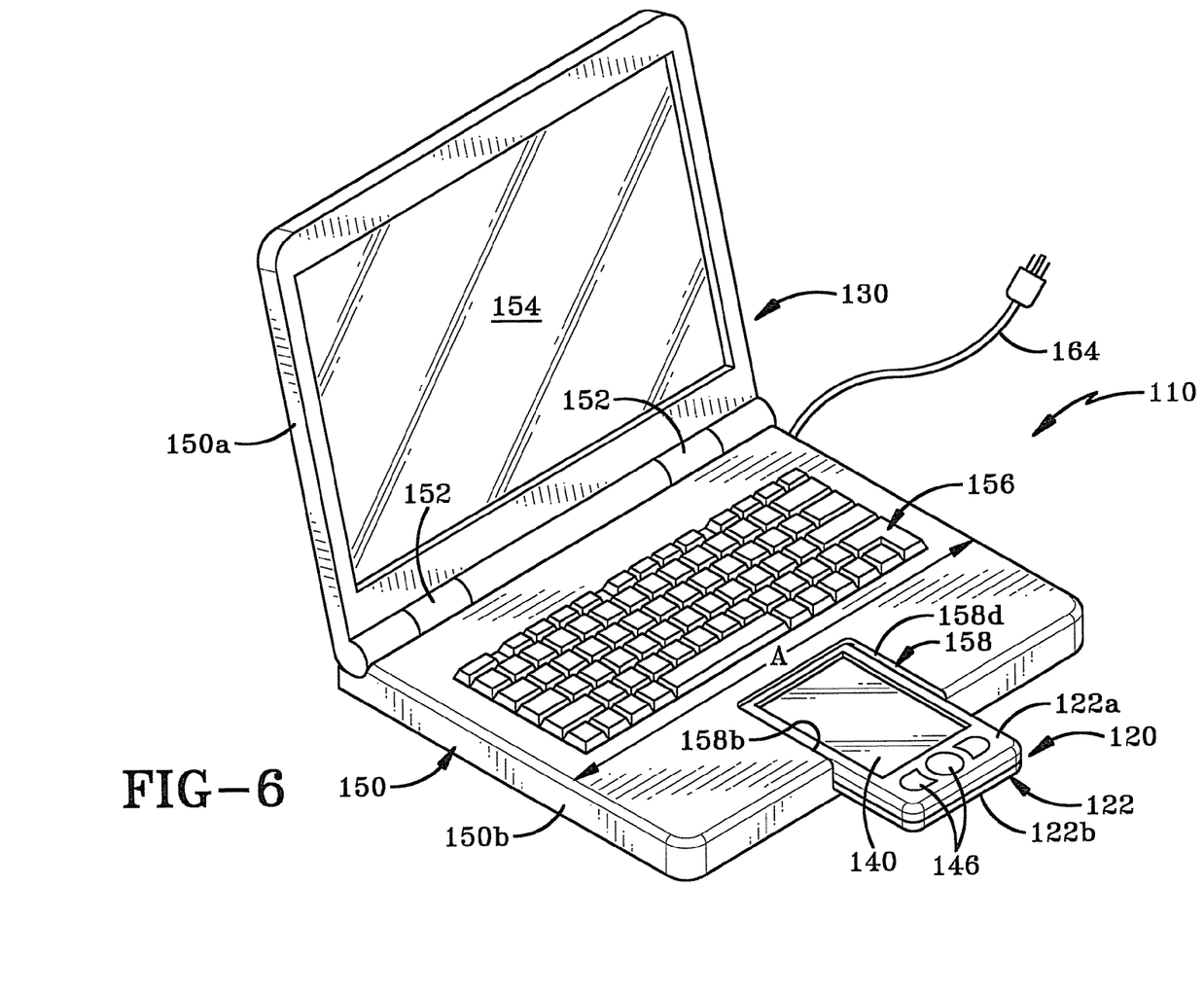
FIG. 6 is a perspective view of a second embodiment of a portable computing, communication and entertainment device in accordance with the present invention.
Figure 7:
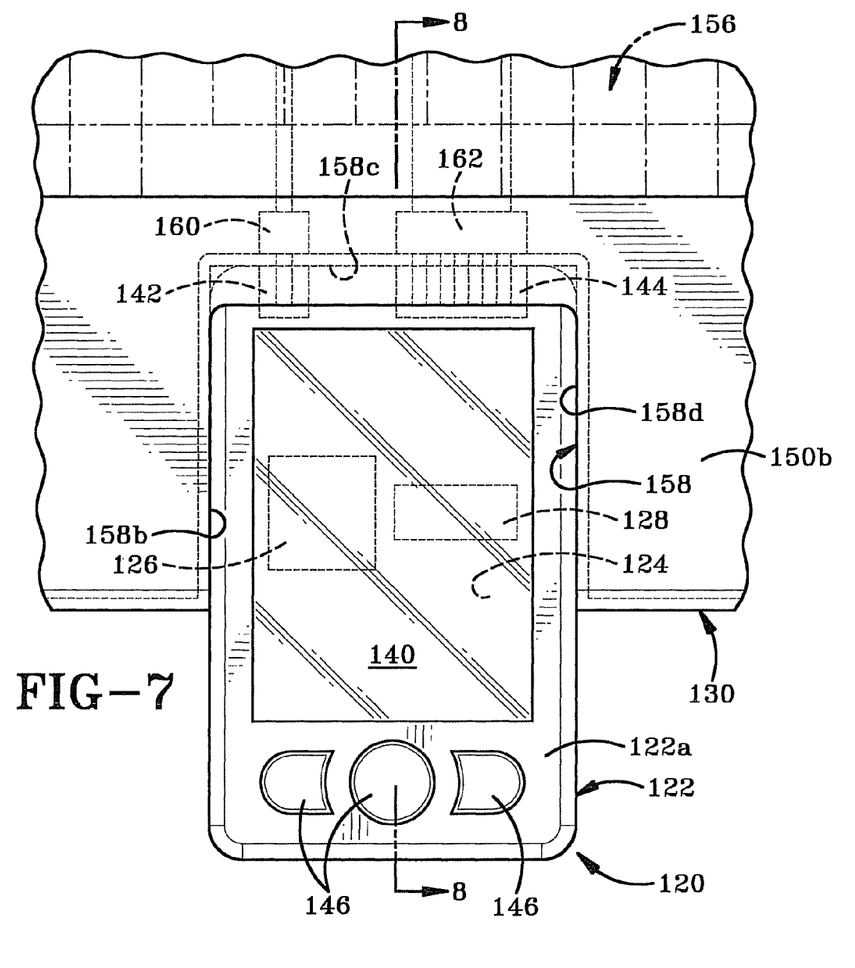
FIG. 7 is an enlarged front view of the detachable portable device shown in a partially docked position with the docking display unit.

FIG. 5 shows docking display unit 30 mounted on the floor of a vehicle 70. The bottom end of a pedestal 60 is attached to the vehicle floor 70. Clamps 61 are attached to the top end of pedestal 60. Docking display unit 30 can be removably mounted on pedestal 60 using bolts or other conventional methods. Detachable handset unit 20 can then be docked in docking display unit 30 in the same manner as in other applications described hereinbefore.

The ordinarily skilled artisan should now appreciate that in this way a portable device for computing, communication and/or entertainment can be created that has a detachable handset unit. When mated with a docking display unit, the detachable handset unit becomes the controller for the entire portable computing, communication and entertainment device. The detachable handset unit is in a smaller housing that is dimensioned for handheld grasping, and is sized to be carried in a pocket like an average cell phone. The docking display unit carries an auxiliary, larger display and other components. The central processor, carried in the detachable handset unit, and being used to operate the docking display unit, must have enough processing power to adequately perform functions of an entire portable computing, communication and entertainment device, and not just the function of a wireless phone. Examples of commercially available processors adequate for this task include the Intel StrongARM processor, the models SH-3 and SH-4 processors from Hitachi American, Ltd. of Brisbane, Calif., and the model 4100RISC processor from NEC America, Inc. of Irving, Calif.

As technology advances in the future, the Pentium processor from Intel, used in most laptop computers, may be used in other embodiments of the current invention. The other components used in device 10 can be similar to those employed by traditional computing devices, communication devices and entertainment devices. Typical of these other components are: liquid crystal displays of small and large sizes from Optrex America Inc. of Detroit, Mich., and Seiko Instruments USA, Incorporated of Torrance, Calif.; memory chips from Micron Technologies, Inc. of Boise, Id., VLSI Technologies wireless communication chips available from Philips North America in Atlanta, Ga., power supply chips from Analog Devices Inc. of Norwood, Mass., and pen-input panels from MicroTouch Systems, Inc. of Methuen Mass.

Device 10 as described hereinbefore will require operating system software such as Microsoft Windows or WindowsCE. Off-the-shelf application software such as Microsoft Outlook, PocketWord, etc. can be used for various tasks. Alternately, the Java software platform from Sun Microsystems, Inc. of Palo Alto, Calif., can be implemented in device 10. In this instance, Java applets can be downloaded into device 10 from the Internet via wireless communication circuit 21 or via wired communication circuit 33.

Referring to FIGS. 6-9, there is shown a second embodiment of a portable device for computing, communication and/or entertainment, said device being generally indicated by the numeral 110. Device 110 comprises a detachable portable device 120 and a docking display unit 130.

Detachable portable device 120 is contemplated to be any portable electronic device that a user may select to provide a range of computing, communication and entertainment applications. Preferably, portable device 120 is a smartphone that is used for such applications. Examples of smartphones suitable for use as portable device 120 include the i900 smartphone made by Samsung Electronics Co. Ltd. of the Republic of Korea, or the Portégé G810 made by the Toshiba Corporation of Tokyo, Japan. These smartphones have a wide range of capabilities beyond being useful as a phone. They permit the user to browse the Internet, send and receive text messages, act as navigation devices, organize personal information, are media players that may be used to play music, view videos, take and transmit photographs, they may be used for reading documents in various formats and for gaming, to name but a few applications. These devices preferably include a touchscreen for user interface but may additionally be provided with a keyboard and directional pads for gaming. They are preferably, but not necessarily, designed for wireless communication. It will be understood that any type of smartphone or portable personal communications device may be utilized in the present invention without departing from the spirit thereof.

Portable device 120 includes a housing 122 having a top 122*a* and a bottom 122*b* that are secured together. Top 122*a* and bottom 122*b* define an interior cavity 124 within which is retained a variety of components that enable the device to be used for all of the above-named applications. Specifically, portable device 120 includes a central processing unit 126 and a rechargeable power supply 128 for powering the same. Both the central processing unit 126 and power supply 128 are retained within cavity 124. Top 122*a* of housing 122 is provided with a touchscreen 140 that acts as a primary user interface for the device. Housing is also provided with a power jack 142, one or more communications jacks 144, control buttons 146 for switching the device on and off etc. Although not illustrated for the sake of clarity, housing 122 further contains circuitry therein that links the various components to power supply 128 so that the various components may be powered thereby. Portable device 120 is designed to be easily grasped in the hand and is of a size that preferably will permit the user to slip the same into a pocket in their clothing.

In accordance with a specific feature of the present invention, display unit 130 is designed and manufactured to be complementary to a specific portable device 120 and to act as a docking station for the same. Consequently, different portable devices will be designed to dock with their own specially designed docking display units 130. The display unit 130 in accordance with the present invention preferably is a notebook-type device having the external appearance of a laptop computer. Display unit 130 may be a device that includes a central processing unit or may be a device that is devoid of a central processing unit and is merely a shell. Preferably, display unit 130 has the configuration of a laptop computer, but it will be understood that a desktop computer could also incorporate a docking port for physically engaging a portable device 120 therein.

In accordance with a specific feature of the present invention, display unit 130 comprises a housing 150, preferably of a clamshell type, having a first region 150*a* and a second region 150*b* secured together by a hinge 152. Preferably, first region 150*a* includes a display screen 154, such as a liquid crystal display screen, and second region 150*b* includes a keyboard 156. First region 150*a* is foldable onto second region 150*b* when the device is not in use or needs to be transported. Display unit 130 does not include a touch pad or track pad for user interface. Display unit 130 does, however, includes circuitry (not shown) that operationally connect a power jack connector 160 and a communication jack connector 162 to display screen 154, keyboard 156 and to a rechargeable power supply (not shown). However, unless and until portable device 120 is engaged with display unit 130, as will be hereinafter described, these circuits remain open and neither the keyboard 156 nor the display screen 154 can be activated. 130. When portable device 120 is docked in display unit 130, the power supply in the portable device 120 is recharged by the power supply in the display unit 130. Display unit 130 is also connectable via a power cord 164 and AC/DC adapter (not shown) to a remote AC power source to recharge the power supply in the display unit 130. If the display unit 130 is connected to the remote AC power source when portable device 120 is docked therewith, the remote AC power source will recharge the power supply in the portable device 120. The rechargeable power supply in display unit 130 also powers functions such as lighting the display screen 154 when portable device 120 is docked with display unit 130.

Figure 9:
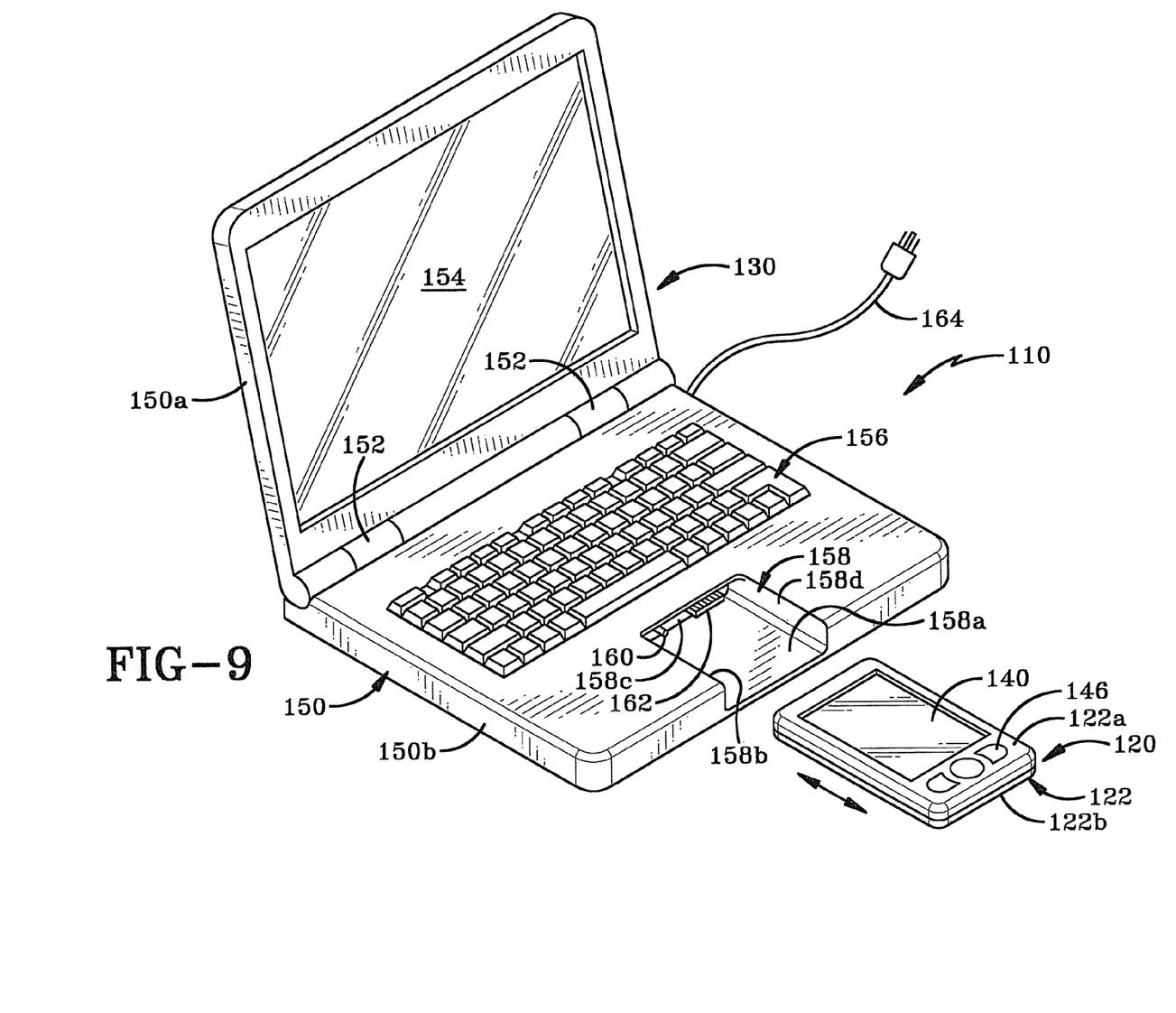
FIG. 9 is a perspective view portable device showing the detachable portable device completely disengaged from the docking display unit.

In accordance with a specific feature of the present invention and as shown in FIG. 9, second region 150b of housing 150 defines a docking port 158 therein. Docking port 158 preferably is disposed in a location adjacent keyboard 156 and in a region where a touch pad for a conventional laptop computer would normally be located. In the attached figures, docking port 158 is situated in the middle of the front edge of second region 150b and docking port 158 is oriented substantially at right angles to the length "A" of the front edge. Docking port 158 is therefore designed to receive a portable device 120 that will be disposed at right angles to the front edge of the second region 150b. It will be understood, however, that docking port 158 may alternatively extend inwardly from a side edge of second region 150b and be disposed substantially parallel to the length "A" of second region 150b. The portable device that is received in this alternatively oriented docking port will be inserted into said docking port at right angles to the side edge thereof.

Figure 8:
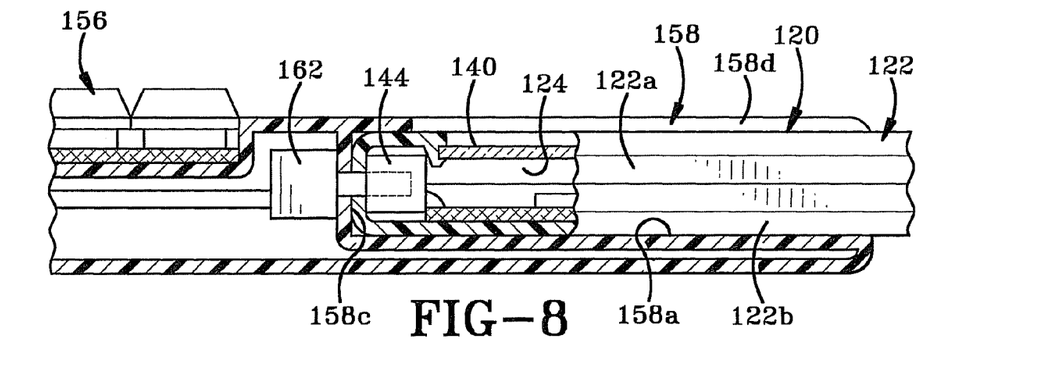
FIG. 8 is a cross-sectional side view of the detachable portable device and docking display unit taken through line 8-8 of FIG. 7.

Referring to FIGS. 6-9, docking port 158 is recessed into the external surface of the front edge of second region 150b and at right angles to length "A". Docking port 158 is defined by a bottom wall 158a and a peripheral wall extending upwardly therefrom. Peripheral wall comprises side walls 158b, 158c, and 158d. Side wall 158b originates in the front edge of second region 150b and side wall 158d terminates in the front edge thereof. Consequently, side wall 158b is spaced a distance away from side wall 158d and a gap is defined therebetween. This gap, which is disposed opposite side wall 158c, constitutes a slot into which portable device 120 is insertable. A power jack connector 160 and a communications jack connector 162 are provided on side wall 158c. Power jack connector 160 and communications jack connector 162 may be recessed into side wall 158c or may extend outwardly from side wall 158c and for a short distance over bottom wall 158a. Connectors 160, 162 are disposed in positions where they will be engageable with power jack 142 and communications jack 144 on portable device 120. The exact positions of power jack connector 160 and communications jack connector 162 are determined by the type of portable device 120 that is to be docked in docking port 158. As shown in FIG. 8, a small region of the upper wall of second region 150b extends outwardly beyond side wall 158c and for a short distance over bottom wall 158a. This small region acts as a guide for proper seating of portable device 120 in docking unit 130. It also protects power jack connector 160 and communications jack connector 162 from accidental impact.

Portable device 120 is docked with display unit 130 by inserting portable device 120 into the gap formed between side walls 158b, 158d and into docking port 158 (FIG. 9). Care must be taken to ensure that the correct leading edge of portable device 120 is inserted first into docking port 158, the correct leading edge being the side on which the power jack 142 and communications jack 144 are provided. The bottom 122b of housing 122 of portable device 120 is slid along the bottom wall 158a of docking port 158. As portable device 120 slides along bottom wall 158a of docking port 158, the leading edge slides under the lip formed by the upper wall of second region 150b and power jack 142 engages power jack connector 160 and communications jack 144 engages communications jack connector 162. As shown in FIGS. 6-9, docking port 158 preferably is oriented substantially at right angles to the length "A" of display unit 130. This orientation places touchscreen 140 and control buttons 146 in a suitable position for easy activation by the user. The orientation of portable device 120 also ensures that the portion of portable device 120 including touchscreen 140 has a solid base under it in the form of bottom wall 158a. Consequently, any downward pressure on touchscreen 140 will not result in a downward rotation of portable device 120 that would cause power and communications jacks 142, 144 and power and communication jack connectors 160, 162 to disconnect. The small lip of the upper wall of second region 150b that extends over the front edge of portable device 120 also aids in preventing downward rotation of portable device 120.

Once portable device 120 is engaged in docking port 158 and is thereby fully docked into display unit 130, the central processing unit 126 of portable device 120 becomes the brain of display unit 130 and is able to control the display screen 154 and keyboard 156. Portable device 120 is provided with all of the software that switches the user interfaces as necessary between touchscreen 140 and keyboard 156 and is used to drive both portable device 120 and display unit 130 when they are operationally connected together. The results of the activation and manipulation of touchscreen 140 and keyboard 156 are displayed on display screen 154 of display unit 130. Display unit 130 effectively acts as a device for enlarging the display of portable device 120 which would typically only be viewable only on touchscreen 140. Display unit 130 also makes it easier for the user to type text using the full size or almost full size keyboard 154, thus making it easier to input data into portable device 120. Although not specifically illustrated herein, display unit 130 may also be provided with speakers or with a connection to external speakers that can enhance the audio output from portable device 120. Consequently, when portable device 120 is docked with display unit 130, the output from portable device 120, whether visual or auditory, is enhanced.

When the user no longer needs the enlarged display screen 154 and keyboard 156, they slide portable device 120 out of docking port 158. This deactivates display unit 130 causing it to revert to being merely a shell. Display unit 130 may then be folded up for transportation or storage as previously described. The user will dock portable device 120 with display unit 130 when full notebook functionality is required. When full notebook functionality is no longer required, portable device 120 will be detached from display unit 130 Portable device 120, once fully detached from display unit 130 is useful as the small handheld computing, communication and entertainment device it was manufactured to be.

Device 110 is therefore an electronic device that comprises a first docking portion, being display unit 130, which has a housing with a first set of electronic circuits that provide a first set of functions. The housing defines a recessed docking port therein. Device 110 further comprises a second portable electronic device, being portable unit 120, which has a housing, at least a region of which is complementary shaped to fit into the recessed docking port. The portable unit 120 has a second set of electronic circuits that perform a second set of functions. The portable unit 120 is physically docked into the display unit 130. A communications port connects the display unit 130 and portable unit 120 so that the first and second sets of electronic circuits are operationally connected. In the attached figures, that communications port comprises one or more jacks on the portable unit 120 and complementary connectors on the display unit 130. It will be understood, however, that the communications port could comprise a wireless connection between the first and second sets of electronic circuits in the display unit 130 and portable unit 120. The communications port enables communication between the first set of electronic circuits and the second set of electronic circuits such that when portable unit 120 is physically engaged in docking port, display unit 130 takes on the second set of functions.

Docking port 158 is recessed into the second region 150b of the docking unit 130 and the gap between side walls 158b, 158d opens at the edge of second region 150b. Consequently, portable unit 120 may be slidably inserted into this gap when first region 150a is in a folded or closed position (not shown) relative to second region 150b or is in an open position relative thereto, such as is illustrated in the attached figures.

Referring to FIGS. 10-15, there is shown a personal computing device in accordance with the present invention. The computing device is useful for computing, communication and/or entertainment applications and is generally indicated by the numeral 210. Device 210 comprises a detachable hands-free operation type of headset unit 220 and a docking display unit 230. Docking display unit includes a docking port 240 that is complementary configured to receive and retain headset unit 220 therein.

Figure 10:
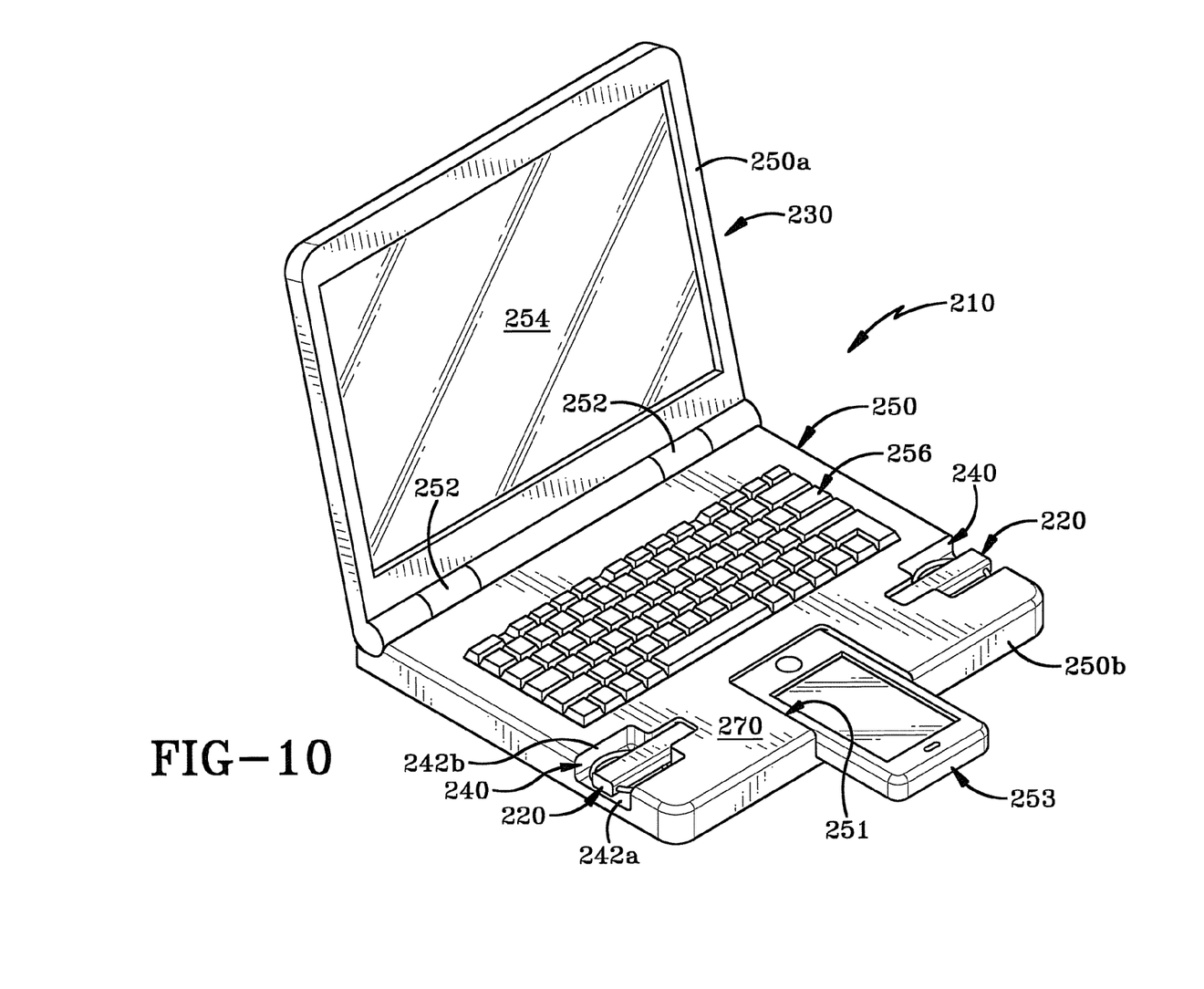
FIG. 10 is a perspective view of a personal computing device including at least one docking port for receiving a hands-free headset therein and showing the hands-free headset docked therein.

Detachable headset unit 220 is a hands-free operation headset, i.e., a wireless headset, that is useful for listening to any type of music, audio clips, phone conversations and the like that are transmitted from or played on display unit 230. Suitable types of headset units 220 include Bluetooth® compatible hands-free operation headsets such as the Jabra BT5020 Bluetooth cell phone headset manufactured by Jabra Corporation of San Diego, Calif. or the Motorola H500 manufactured by Motorola, Inc. of Schaumburg, Ill. (Bluetooth is a registered trademark of Bluetooth Sig, Inc. of Bellevue, Wash.)

Headset unit 220 comprises a housing 232 having an earpiece 234 extending outwardly therefrom and being configured to be engaged on the earlobe of a user. Headset unit 220 has a built-in power jack 236 and an internal power supply 238. The specifics of the shape and style of headset unit 220 are dependant on the design thereof and are not material to the present invention other than that they dictate the complementary configuration of docking port 240 on display unit 230.

Referring to FIGS. 10-13, there is shown a first exemplary display unit 230 that may incorporate the docking port 240 and engage the headset unit 220 therein. Display unit 230 is a laptop computing device or notebook type of computing device having a housing 250 that preferably is of a clamshell type. Housing 250 includes a first region 250a and a second region 250b that are secured together by a hinge 252. First region 250a may be pivoted into abutting contact with second region 250b when display unit 230 is not in use, and may be pivoted out of contact with second region 250b when display unit 230 is to be used. Preferably, first region 250a includes a display screen 254, such as a liquid crystal display screen, and second region 250b includes a keyboard 256. The computing and communication device 210 shown in these figures preferably is of the type shown in FIGS. 6-9. However, display unit 230 includes an additional docking port 251 within which a portable computing device 253, such as a smartphone, may be selectively docked. When the portable computing device 253 is docked in docking port 251, the touchscreen 255 of portable computing device 253 becomes a user interface for display unit 230. Portable computing device 253 includes a central processing unit that acts as the brain for the combined computing and communication device 210.

In accordance with a specific feature of the present invention, display unit 230 includes at least one docking port 240 configured to selectively receive and retain headset unit 220 therein. Display unit 230 may, as shown in the attached Figures, include a pair of docking ports 240 therein, each docking port 240 being configured to receive a separate headset unit 220 therein. Docking port or ports 240 may be located anywhere on display unit 230 without departing from the spirit of the present invention. Although not illustrated in the attached figures, a single docking port may, alternatively, be configured to receive a pair of headset units therein, with said pair of units being disposed in a side-by-side configuration or one above the other. Furthermore, while docking ports s40 are shown in FIG. 10 to permit headset units 220 to be slidably inserted from the side edge of display unit 230, it will be understood that docking port 240 may be a shaped recess formed in one of the first and second regions 250a, 250b that is not accessible from any of the side edges of either of the first and second regions 250a, 250b.

Figure 11:
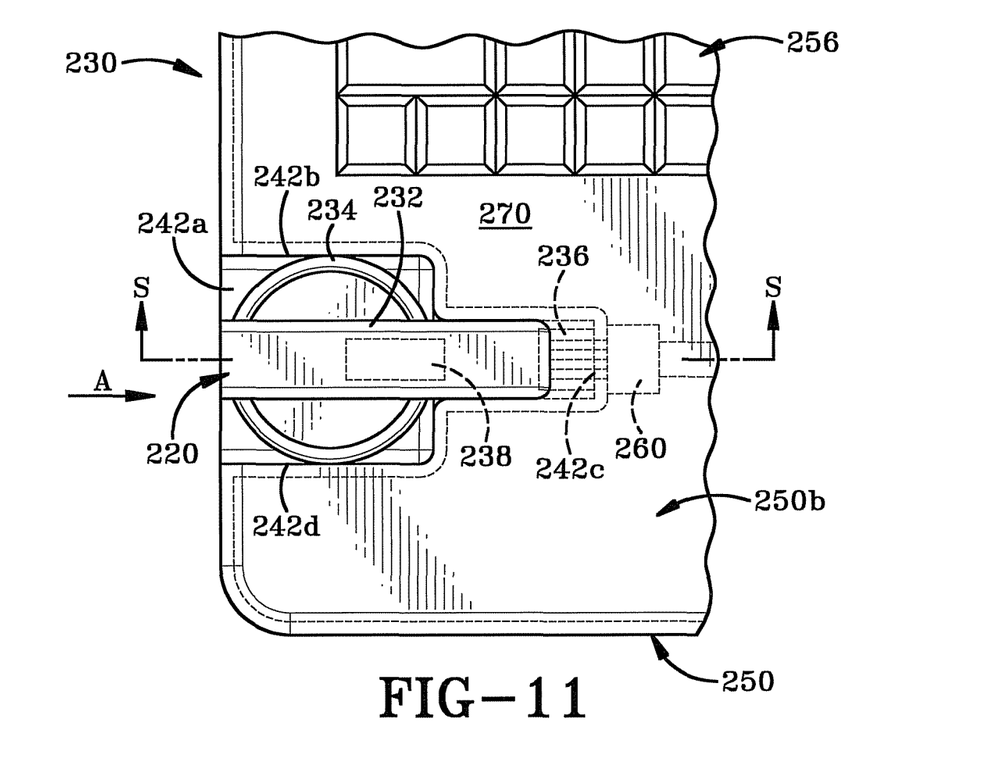
FIG. 11 is an enlarged top view of the docking port with the hands-free headset docked therein.
Figure 12:
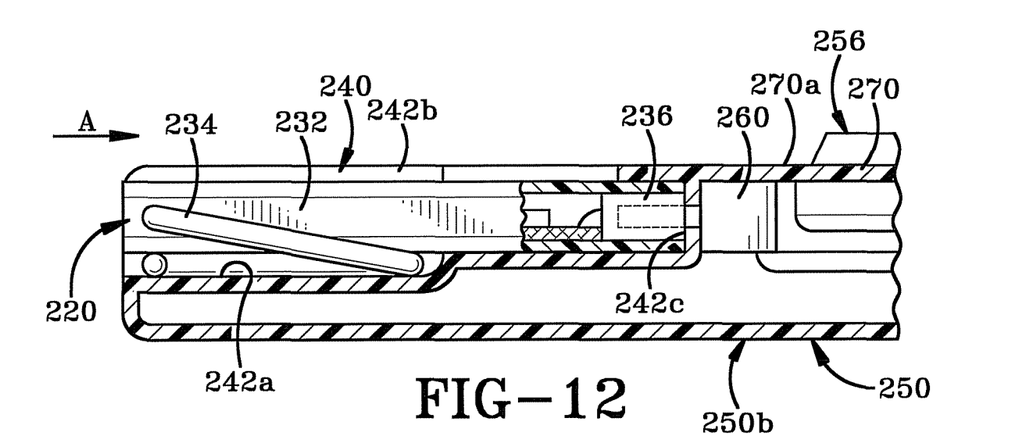
FIG. 12 is a cross-sectional front view through line S-S of FIG. 11.
Figure 13:
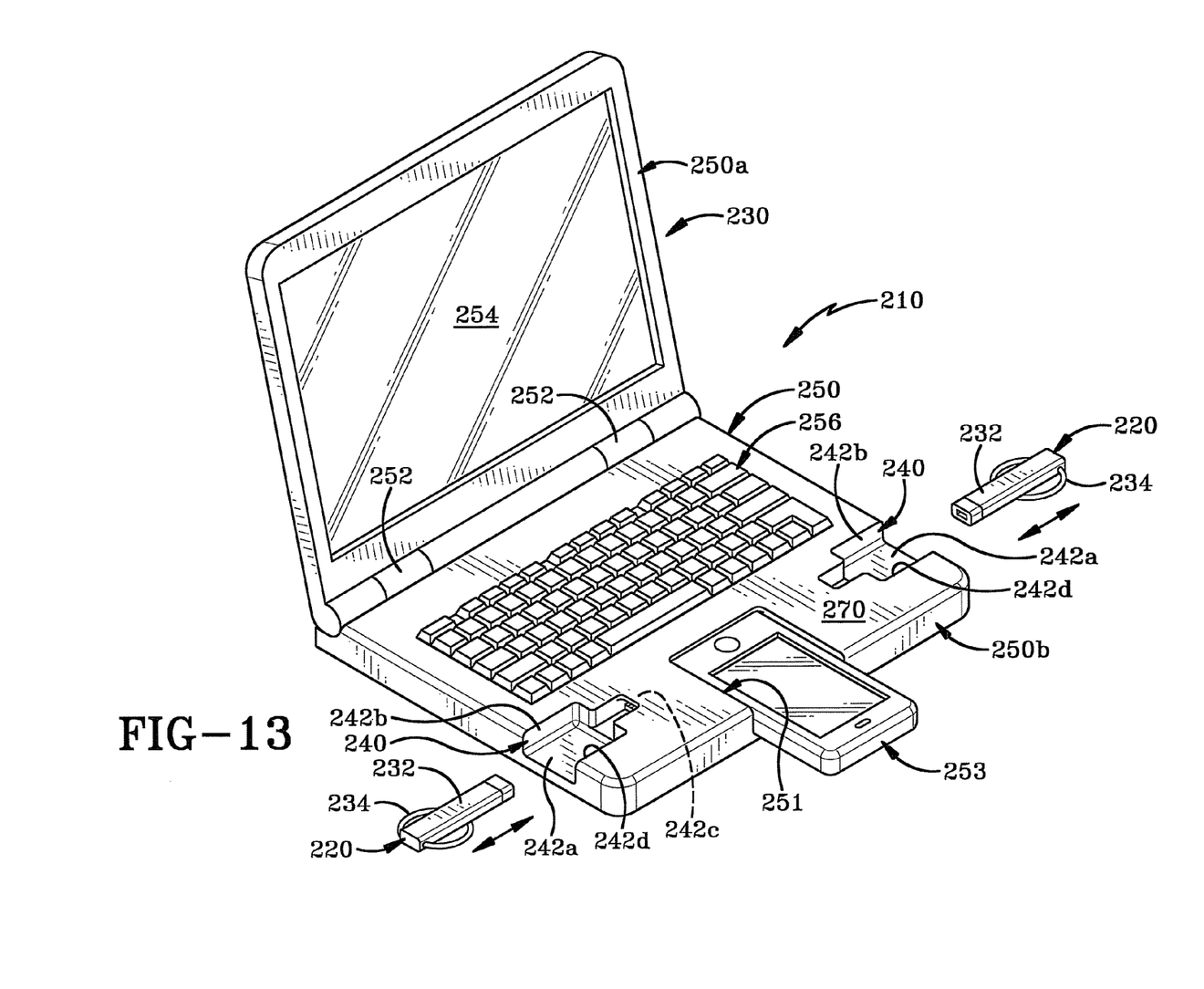
FIG. 13 is a perspective view of the personal computing device showing a pair of hands-free headsets disengaged from the device and showing the docking ports in the computing device.

As illustrated in the attached figures, docking port 240 is designed to be complementary configured to a particular headset unit 220 and to act as both a storage location and a power supply recharging station for the same. Docking port 240 is recessed into second region 250b of the housing 250 of display unit 230 adjacent keyboard 256 and spaced a distance from docking port 251. Referring to FIGS. 11 and 12, docking port 240 includes a bottom wall 242a and side walls 242b, 242c, 242d. Preferably, the portion of docking port 240 opposite side wall 242c is open so that headset unit 220 may be slidably inserted therein and removed therefrom. A power jack connector 260 is provided in one of the side walls, such as side wall 242c. The exact position of power jack connector 260 is dictated by headset unit 220. Connector 260 may be recessed into side wall 242c or may extend outwardly away therefrom for a short distance over a portion of bottom wall 242a, and is positioned where it will be easily engageable with power jack 236 on headset unit 220. Display unit 230 includes a set of circuits (not shown) that operationally connect power jack connector 260 to the central processing unit (not shown) within display unit 230. Display unit 230 includes a power supply (not shown) that is operationally connected into the set of circuits to provide power to both display unit 230 and headset unit 220 when docked therewith. Consequently, when headset unit 220 is docked in docking port 240, the power supply 238 therein is recharged. Display unit 230 also includes transmitters (not shown) that wirelessly transmit auditory signals to headset unit 220.

Headset unit 220 is docked with display unit 230 by sliding the housing 232 thereof along bottom wall 242a of docking port 240. Headset unit 220 is slid inwardly until preferably no part thereof extends outwardly beyond the side wall 230a (FIG. 11) of display unit 230. Furthermore, docking port 240 is of a depth that is sufficient so that headset unit 220 does not project outwardly beyond outer surface 270a of the wall 270 of housing second region 250b of housing. Consequently, when first region 250a is pivoted into a closed position onto second region 250b, first region 250a does not directly contact headset unit 220 and thereby potentially cause damage to the same. It will be understood that docking port 240 preferably is designed so that headset unit 220 is frictionally engaged therein. It is contemplated however that some other securement might be provide to retain headset unit 220 within docking port 240. The design of docking port 240 also ensures that a solid base is provided under headset unit 220 in the form of bottom wall 242a. Consequently, any downward pressure on headset unit 220 will not result in a downward rotation thereof in a manner that would cause power jack 236 and power connector 260 to disengage or become damaged.

Headset unit 220 is engaged in docking port by inserting the power connector end thereof into the open region opposite side wall 242c. Headset unit 220 is slid inwardly into docking portion along bottom wall 242a in the direction of arrow "A" until power connector 236 interlockingly becomes engaged in power jack 260. As power connector 236 engages power jack 260, electrical current flows through the same and into the circuitry within headset unit 220, thereby leading to a recharging of the power supply 238 within headset unit 220. Headset unit 220 is stored in this position until the user wishes to use headset unit 220 to listen to some type of audio input. When needed, the user slides headset unit 220 outwardly from docking port 240 by engaging the same with one or more fingers and moving the headset unit 220 in the opposite direction to arrow "A". Power jack 236 disengages from power connector 260 and headset unit 220 may then be slid outwardly or lifted outwardly from docking port 240. The earpiece 234 is positioned appropriately on the earlobe of the user and an activation button (not shown) is engaged to switch the headset unit 220 on.

When the user is finished listening to the audio input through the headset unit(s) 240, the activation button (not shown) is engaged to switch the headset unit 220 off. The headset unit 220 is then re-inserted into docking port 220 as previously described. When so engaged, display unit 230 may be connected to headset unit 220 in such a manner that a speaker system (not shown) in display unit 230 receives signals that have been initially received by hands-free headset unit 220 and transmitted thereby to the display unit 230 to amplify the same. This will permit the user to hear the audio output through speakers in the display unit 230 instead of through headset unit 220.

Figure 14:
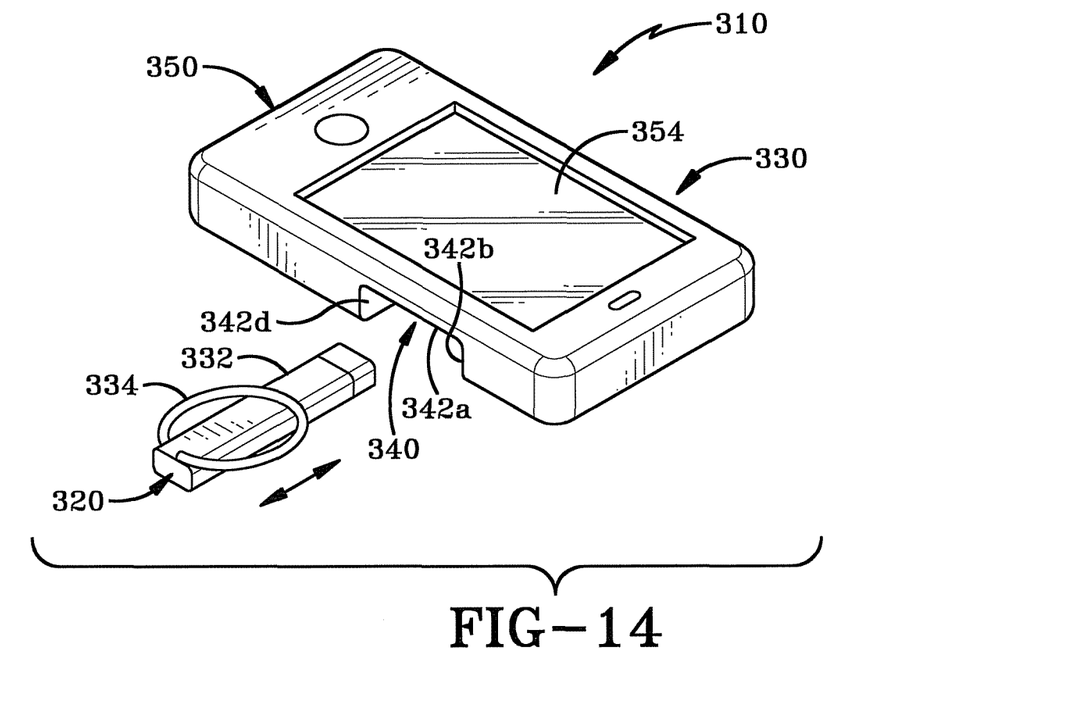
FIG. 14 is a front perspective view of an alternative embodiment of a personal computing device in accordance with the present invention and including at least one docking port for receiving a hands-free headset unit therein.
Figure 15:
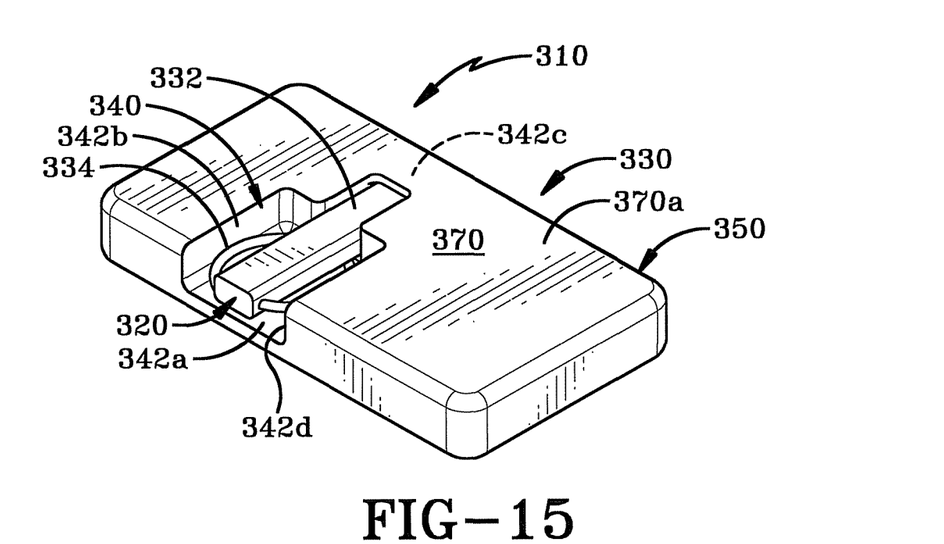
FIG. 15 is a rear perspective view of the alternative embodiment of the personal computing device showing the hands-free headset unit docked in the docking port.

FIGS. 14 and 15 show another embodiment of a computing, communication and entertainment device in accordance with the present invention and generally indicated at 310. Device 310 utilizes a second embodiment of a display unit 330 that has at least one docking port 340 for receiving a headset unit 320 therein. In this instance, display unit 330 is a device such as a smartphone that has a housing 350 that includes a touchscreen 354 in a front surface thereof. Housing 350 also defines includes one or more docking ports 340 therein for receiving a wireless headset unit 320 therein, such as a Bluetooth compatible headset unit.

Preferably, docking port 340 is defined in the rear wall 370 of display unit 330 and is sufficiently recessed into rear wall 370 that headset unit 320 does not extend outwardly beyond outer surface 370a when docked in docking port 340. As with docking port 240, docking port 340 is a recessed region having a bottom wall 342a and side walls 342b, 342c, 342d. Preferably, the portion of docking port 340 opposite side wall 342c is open so that headset unit 320 may be slidably inserted therein and removed therefrom. All other features of docking port 340 are substantially identical to docking port 240. Display unit 330 is designed to act as a storage location for the headset unit 320 and simultaneously is useful for recharging the batteries of the headset unit 320 when so docked.

While the figures attached hereto have illustrated two possible communications devices that include docking ports for retaining, storing and recharging a hands-free headset therein, those two devices being a laptop computer and a smartphone, it will be understood that docking ports could be provided on any electronic device that is capable of playing or transmitting auditory signals to hands-free headsets. So, for example, desktop computers could similarly be provided with such docking ports as could MP3 players, radios, TV's etc., all without departing from the spirit of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. In combination:
   a display unit including:
      a housing having an exterior wall;
      a display screen provided in said exterior wall;
      a keyboard provided in said exterior wall;
      a first recessed region defined in said exterior wall;
      a second recessed region defined in the exterior wall and spaced from the first recessed region;
   a portable unit having a central processor therein; said portable unit being separate from the display unit and being configured to be selectively engaged in said first recessed region; wherein the central processing unit of the portable unit is operable to control the display screen of the display unit when the portable unit is engaged in said first recessed region; and
   a headset configured to be selectively received in the second recessed region; and wherein said headset is retained within the second recessed region for storage and is removed therefrom for use.

2. The combination as defined in claim 1, wherein the portable unit includes a touchscreen that becomes a user interface for the display unit when the portable unit is engaged in the first recessed region.

3. The combination as defined in claim 1, wherein the display unit further includes:
   a rechargeable power supply disposed within the housing thereof and adapted to be operationally connected to a remote power source;
   a first power connector provided in the first recessed region, said first power connector being operationally connected to the rechargeable power supply;
   and wherein said portable unit further includes a power jack that is matingly engageable with the first power connector when the portable unit is engaged in the first recessed region;
   whereby a rechargeable power supply in the portable unit is charged when so engaged.

4. The combination as defined in claim 3, wherein the display unit further includes:
   a second power connector provided in the second recessed region and being operationally connected to the remote power source;
   wherein the headset further includes a power jack that is matingly engageable with the second power connector when the headset is engaged in the second recessed region, whereby a rechargeable power supply in the headset is charged when so engaged.

5. The combination as defined in claim 1, wherein the headset is frictionally retained within the second recessed region.

6. The combination as defined in claim 1, wherein the second recessed region includes;
   a bottom wall that is spaced a distance inwardly away from an outer surface of the exterior wall of the housing;
   a peripheral side wall that extends between the bottom wall and the outer surface of the exterior wall, and when said headset is engaged in the second recessed region, said headset does not extend outwardly beyond the outer surface.

7. The combination as defined in claim 6, wherein the peripheral side wall includes:
   a first side wall that originates proximate a side edge of the housing;

a second side wall that terminates proximate the side edge of the housing and a spaced distance away from the first side wall, whereby a gap is defined between the first and second side walls; and wherein said gap is of a sufficient size to permit the headset to be slidably inserted through the gap and into the second recessed region.

8. The combination as defined in claim 7, wherein the bottom wall is substantially parallel to the outer surface of the exterior wall and the entire bottom wall is exposed and visible when the headset is not engaged in the second recessed region.

9. The combination as defined in claim 1, further comprising a third recessed region defined in the exterior wall of the housing a spaced distance from the first and second recessed regions; and the combination further includes:
    a second headset complementary to the third recessed region; and wherein the second headset is engaged in the third recessed region for storage and is removed therefrom for use.

10. The combination as defined in claim 9, further comprising a third power jack provided in the third recessed region, said third power jack being operationally connected to the rechargeable power source retained within the housing; and wherein the second headset further includes a third power jack connector configured to be matingly engageable with the third power jack when the second headset is retained within the third recessed region; whereby a rechargeable power supply in the second headset is charged when the second headset is engaged in the third recessed region.

11. The combination as defined in claim 1, wherein the display unit is one of a laptop computer, a desktop computer, a smartphone, a cell phone, an MP3player, a personal navigation system and a personal digital assistant.

12. The combination as defined in claim 1, wherein the display unit is a laptop computer having a top and a bottom that are hinged together, where the bottom includes a keyboard, and wherein the first recessed region is defined adjacent the keyboard.

13. The combination as defined in claim 12, wherein the bottom of the display unit further defines the second recessed region_therein; and said display unit further includes a first electrical circuit for performing a first set of functions.

14. The combination as defined in claim 13, wherein the portable unit includes a second electrical circuit for performing a second set of functions; and whereby the display unit takes on the second set of functions when the portable computing unit is engaged within the second recessed region.

15. In combination:
    a wireless headset;
    a display unit having a housing with an exterior wall and a first electrical circuit therein; said display unit being devoid of a central processor;
    a portable unit separate from the display unit, the portable unit having a central processor and a second electrical circuit therein for performing a set of functions; and wherein said central processor is capable of transmitting a communications signal to said wireless headset;
    a first docking port defined in said exterior wall; said first docking port accommodating said headset, whereby said headset is selectively physically engageable in the first docking port for storage and is removable therefrom for use;
    a second docking port defined in said exterior wall, said second docking port accommodating said portable unit; whereby said portable unit is selectively physically engageable in the second docking port;
    a communications port provided in the display unit for operationally connecting to a complementary communications port in the portable unit, said communications ports being operationally connected to each other when said portable unit is physically docked in the second docking port; and when so docked the display unit takes on the set of functions.

16. The combination as defined in claim 15, wherein the portable unit includes a touchscreen and when the portable unit is docked in the second docking port, the touchscreen becomes a user interface for the display unit.

17. The combination as defined in claim 16, wherein the portable unit is a smartphone.

18. The combination as defined in claim 15, further comprising a third docking port defined in the exterior wall of the housing a spaced distance from the first and second docking ports; and the combination further includes:
    a second headset complementary to the third docking port; and wherein the second headset is engaged in the third docking port for storage and is removed therefrom for use.

19. The combination as defined in claim 18, further comprising a third power jack provided in the third docking port, said third power jack being operationally connected to a rechargeable power source retained within the housing; and wherein the second headset further includes a third power jack connector configured to be matingly engageable with the third power jack when the second headset is retained within the third docking port;
    whereby a rechargeable power supply in the second headset is charged when the second headset is engaged in the third docking port.

20. The combination as defined in claim 15, wherein the display unit is a clamshell type computing device having a top and a bottom that are hinged together, where the bottom includes a keyboard, and wherein the first recessed region is defined adjacent the keyboard.

21. The combination as defined in claim 20, wherein the bottom of the display unit further defines the second docking port therein; and wherein the first electrical circuit is adapted for performing a second set of functions.

22. In combination:
    a portable unit including:
        a housing having an exterior wall,
        a display screen provided in said exterior wall,
        a central processor operable to control the display screen,
        a rechargeable power supply disposed within the housing and adapted to be operationally connected to a remote power source;
        a first recessed region defined in said exterior wall, said first recessed region having a first power connector operationally connected to the rechargeable power supply, and
        a second recessed region defined in said exterior wall, said second recessed region having a second power connector operationally connected to the rechargeable power supply;
    a first headset configured to be selectively received in the first recessed region, wherein said first headset is retained within the first recessed region for storage and is removed therefrom for use, said first headset further including a power jack that is matingly engageable with the first power connector when the first headset is engaged in the first recessed region, whereby a rechargeable power supply in the first headset is charged when so engaged; and a second headset configured to be selectively received in the second recessed region, wherein said second headset is retained within the first recessed region for storage and is removed therefrom for use; said second headset further including a power jack that is matingly engageable with the second power connector when the second headset is engaged in the second recessed region, whereby a rechargeable power supply in the second headset is charged when so engaged.

23. The combination as defined in claim 22, wherein the portable unit is one of a laptop computer, a desktop computer, a smartphone, a cell phone, an MP3 player, a personal navigation system and a personal digital assistant.

24. In combination:
   a laptop computer including:
      a clamshell housing having a first region and a second region secured together by
      a hinge and an exterior wall,
      a display screen provided said first region,
      a keyboard provided in said second region,
      a central processor operable to control the display screen,
      a rechargeable power supply disposed within the housing and adapted to be operationally connected to a remote power source, and
      a first recessed region defined in said exterior wall, said first recessed region having a first power connector operationally connected to the rechargeable power supply;
      a first headset configured to be selectively received in the first recessed region, wherein said first headset is retained within the first recessed region for storage and is removed therefrom for use;
      wherein said first headset further includes a first power jack that is matingly engageable with the first power connector when the first headset is engaged in the first recessed region, whereby a rechargeable power supply in the first headset is charged when so engaged; and
      wherein said first headset wireles sly communicates with the laptop computer to play an audio input wireles sly transmitted from the laptop computer.

25. The combination as defined in claim 24, further comprising a second recessed region defined in the exterior wall of the housing, and
   a second headset configured to be selectively received in the second recessed region, wherein said second headset is retained within the second recessed region for storage and is removed therefrom for use.

26. The combination as defined in claim 25 further comprising: a second power connector provided in the second recessed region, said second power connector being operationally connected to the rechargeable power supply retained within the housing; and
   wherein the second headset further includes a second power jack that is matingly engageable with the second power connector when the second headset is engaged in the second recessed region, whereby a rechargeable power supply in the second headset is charged when the second headset is engaged in the second recessed region.

\* \* \* \* \*